US011858548B2

(12) United States Patent
Visscher et al.

(10) Patent No.: US 11,858,548 B2
(45) Date of Patent: Jan. 2, 2024

(54) STEERING SYSTEM FOR VEHICLES AND VEHICLES HAVING SAME

(71) Applicant: CANADENSYS AEROSPACE CORPORATION, Bolton (CA)

(72) Inventors: Peter Derek Visscher, Lakeside (CA); Peter John Woolfrey, Baden (CA)

(73) Assignee: CANADENSYS AEROSPACE CORPORATION, Bolton (CA)

( * ) Notice: Subject to any disclaimer, the term of this patent is extended or adjusted under 35 U.S.C. 154(b) by 51 days.

(21) Appl. No.: 18/009,375

(22) PCT Filed: Jun. 9, 2021

(86) PCT No.: PCT/CA2021/050784
§ 371 (c)(1),
(2) Date: Dec. 9, 2022

(87) PCT Pub. No.: WO2021/248237
PCT Pub. Date: Dec. 16, 2021

(65) Prior Publication Data
US 2023/0192188 A1 Jun. 22, 2023

Related U.S. Application Data

(60) Provisional application No. 63/037,110, filed on Jun. 10, 2020.

(51) Int. Cl.
*B62D 11/12* (2006.01)
*F16H 57/04* (2010.01)
*F16H 37/08* (2006.01)

(52) U.S. Cl.
CPC ......... *B62D 11/12* (2013.01); *F16H 37/0806* (2013.01); *F16H 57/045* (2013.01)

(58) Field of Classification Search
CPC .......... B62D 9/00; B62D 9/002; B62D 11/02; B62D 11/04; B62D 11/06; B62D 11/10; B62D 11/12; F16H 37/0806; F16H 57/045
(Continued)

(56) References Cited

U.S. PATENT DOCUMENTS 2,730,182 A * 1/1956 Sloane ................... B62D 11/14
180/6.66
3,938,604 A 2/1976 Kugler et al.
(Continued)

OTHER PUBLICATIONS

International Search Report and Written Opinion dated Sep. 14, 2021 on PCT/CA2021/050784.

*Primary Examiner* — Minnah L Seoh
*Assistant Examiner* — Felicia L. Brittman
(74) *Attorney, Agent, or Firm* — BRUNET & CO. LTD.; Robert Brunet; Hans Koenig

(57) ABSTRACT

A steering system for a skid steered vehicle has a variable-speed steering motor, and an asymmetrical steering differential operatively connected to the steering motor and rotatably mounted on a first side of the chassis separately from the propulsion system. The steering differential has a first differential shaft and a second differential shaft, where the asymmetrical differential imparts a greater speed change on the second differential shaft than the first differential shaft. The first differential shaft is connected to a first steering output shaft operatively connected to at least one ground-engaging element on the first side of the vehicle. A speed reducer mounted fixedly on the chassis connects the second differential shaft to a second steering output shaft operatively connected to at least one ground-engaging element on the second side of the vehicle so that the second steering output shaft experiences the same speed change but in an opposite rotational direction as the first steering output shaft.

17 Claims, 4 Drawing Sheets

(58) Field of Classification Search
USPC .......................................... 180/6.44, 248, 375
See application file for complete search history.

(56) References Cited

U.S. PATENT DOCUMENTS

| | | |
|---|---|---|
| 4,614,131 A | 9/1986 | Hall, III |
| 4,614,132 A | 9/1986 | Hall, III |
| 4,732,053 A * | 3/1988 | Gleasman .............. B62D 11/10 475/221 |
| 4,960,404 A | 10/1990 | Reppert et al. |
| 2004/0121871 A1 | 6/2004 | Thompson |
| 2008/0153662 A1 | 6/2008 | Dabbs et al. |
| 2018/0170427 A1 | 6/2018 | Visscher et al. |

* cited by examiner

STEERING SYSTEM FOR VEHICLES AND VEHICLES HAVING SAME

CROSS-REFERENCE TO RELATED APPLICATIONS

This application is a national entry of PCT/CA2021/050784 filed Jun. 9, 2021, which claims the benefit of United States Provisional Application U.S. Ser. No. 63/037,110 filed Jun. 10, 2020, the entire contents of both of which are herein incorporated by reference.

FIELD

This application relates to steering systems for vehicles, in particular skid-steered vehicles, and vehicles comprising such steering systems.

BACKGROUND

Extreme terrain vehicles often use skid steering rather than explicit steering (also known as Ackerman steering). With skid steering, the wheels or tracks of the vehicle are driven at different speeds to produce a steering effect. Skid steering is the only way to steer a twin-track vehicle (such as an army tank), but can also be used on multi-wheeled vehicles. Skid steering allows for reduced complexity and increased robustness of the suspension and steering system, but is less efficient and more difficult to control at higher speeds. Development of large, heavy army tanks accelerated the need for a more efficient and more precise method of steering, but early developments of skid steering for these applications were inefficient (excessive waste heat) and/or imprecise (unable to operate safely at higher speeds). Various steering configurations are known for skid steered vehicles.

Braked differential steering was used on early skid steered vehicles and is still used on some low-cost skid steer vehicles steer. Braked differential steering involves applying brakes to one side of the tracks/wheels to slow the one side. Braked differential steering is very simple, and can work with simple differential axles. Braked differential steering requires no secondary steering power source, but produces a tremendous amount of waste heat and the vehicle slows noticeably during steering events.

Clutched braked steering is a more efficient variation of braked differential steering involving two stage steering inputs. For large radius turns, power is gradually interrupted to the inside wheel/track by decoupling the clutch. For smaller radius turns, power is first interrupted to the inside wheel/track, and a brake is gradually applied to the same side. Clutched braked steering is more efficient than braked differential steering, but the transition between declutching and braking can be difficult for the driver, and operation on slopes is particularly difficult as the drivetrain can easily and instantly be freewheeled. Like braked differential steering, clutched braked steering requires no secondary steering power source.

In brake controlled differential steering, brakes are used to control a differential, resulting in a fixed turning radius when the brake is fully applied. The brake is slipped for larger radius turns (generating waste heat), but brake controlled differential steering is much more efficient than braked differential steering. Like braked differential steering, brake controlled differential steering requires no secondary steering power source. However, brake controlled differential steering does not allow for point turns or high-speed operation.

Maybach double differential steering and triple differential steering also use brakes to control a differential, resulting in a fixed turning radius when the brake is fully applied. In both, the brake is slipped for larger radius turns (generating waste heat), but both Maybach double differential steering and triple differential steering are also much more efficient than braked differential steering. Both require no secondary steering power source, but do not allow for point turns or high-speed operations.

In a Right/Left motor configuration, each side of the vehicle is driven by its own variable speed motor (electric or hydraulic). The Right/Left motor configuration is primarily used in applications involving: small vehicles (less than 1,200 kg), low speeds (less than 30 km/h), mechanically simple vehicles with low mass, and vehicles with low aspect ratio where length:width is less than 2:1, preferably closer to 1.5:1 or lower. In a Right/Left motor configuration, the drive motor needs full torque for low speed steering, and low gearing limits the top speed of the vehicle.

Instead of a Right/Left motor configuration, the steering system can involve controlled differential steering in which a secondary steering motor and a steering transmission distribute steering power to the right and left sides of the vehicle. Steering transmission configurations rely on planetary gearsets to produce a superimposition effect so that steering input is superimposed on propulsion input. This allows a primary propulsion motor to be optimized, and the secondary steering motor to be a smaller lower duty cycle motor. Controlled differential steering provides smoother and more precise steering at all speeds, and are typically used in applications involving larger heavier vehicles, higher speed vehicles and vehicles having a length that is much greater than the width.

Double differential steering is a configuration used in almost all double differential steering vehicles today. The double differential steering system uses an infinitely variable speed power source (such as a hydraulic or electric motor) to spin a secondary input shaft to rotate the vehicle. When the secondary input shaft is stationary, the vehicle drives straight. When the secondary input shaft is rotated, an output shaft to one side of the vehicle speeds up, while an output shaft to the other side of the vehicle slows down. Double differential steering is currently the most efficient way to steer a skid steered vehicle as power loss is limited and waste heat is minimized during turns. Double differential steering separates the propulsion and steering power sources and allows them to be optimized, enabling point turns and high-speed operation. In typical practice, double differential transmissions are designed as a unit where the steering and propulsion transmissions are contained in a single housing. The transmission may include High/Low/Neutral/Reverse gearing. The primary disadvantage with the double differential transmissions system is the need for a complex transmission, usually designed with custom transmission parts around a specific power source (electric or hydraulic or mechanical). Double differential transmissions are therefore difficult to customize for specific customers, and are more suited to higher-volume production to amortize transmission development costs.

There remains a need for a double differential steering system for skid steered vehicles, which has a simple design, uses simple transmission parts with little or no customization, can be configured in a variety of different vehicles without the need for different transmission parts and/or is easier to maintain.

SUMMARY

A steering system for a skid steered vehicle comprises: a variable-speed steering power input device mounted on a chassis of the vehicle separately from a propulsion system of the vehicle; an asymmetrical steering differential operatively connected to the steering power input device to receive a single power input from the steering power input device to rotate the asymmetrical steering differential, the asymmetrical steering differential rotatably mounted on the chassis proximate the first side of the chassis separately from the propulsion system so that the asymmetrical steering differential is free to rotate relative to the chassis, and the asymmetrical steering differential having a first differential shaft and a second differential shaft, the asymmetrical steering differential having a first differential shaft and a second differential shaft, the asymmetrical differential imparting a greater speed change on the second differential shaft than the first differential shaft during operation of the asymmetrical steering differential, a first steering output shaft connected to the first differential shaft and operatively connected to the at least one first rotatable ground-engaging element, the first steering output shaft experiencing a speed change when the asymmetrical steering differential receives the single power input from the steering power input device; a second steering output shaft connected to the second differential shaft and operatively connected to the at least one second rotatable ground-engaging element, the second steering output shaft experiencing the same speed change as the first steering output shaft but in an opposite rotational direction from the first steering output shaft when the asymmetrical steering differential receives the single power input from the steering power input device, a speed reducer mounted on the chassis connecting the second steering output shaft to the second differential shaft so that the second steering output shaft experiences the same speed change but in an opposite rotational direction as the first steering output shaft when the asymmetrical steering differential receives power from the steering power input device A skid steered vehicle comprises a chassis; at least one first rotatable ground-engaging element rotatably mounted on the chassis proximate a first transverse side of the chassis and at least one second rotatable ground-engaging element rotatably mounted on the chassis proximate a second transverse side of the chassis so that rotation of the first and second ground-engaging elements moves the vehicle; a propulsion system mounted on the chassis and operatively connected to the first and second rotatable ground-engaging elements for driving the ground-engaging elements; and, a steering system comprising: a variable-speed steering power input device mounted on the chassis separately from the propulsion system; an asymmetrical steering differential operatively connected to the steering power input device to receive a single power input from the steering power input device to rotate the asymmetrical steering differential, the asymmetrical steering differential rotatably mounted on the chassis proximate the first side of the chassis separately from the propulsion system so that the asymmetrical steering differential is free to rotate relative to the chassis, and the asymmetrical steering differential having a first differential shaft and a second differential shaft, the asymmetrical differential imparting a greater speed change on the second differential shaft than the first differential shaft during operation of the asymmetrical steering differential, a first steering output shaft connected to the first differential shaft and operatively connected to the at least one first rotatable ground-engaging element, the first steering output shaft experiencing a speed change when the asymmetrical steering differential receives the single power input from the steering power input device; a second steering output shaft connected to the second differential shaft and operatively connected to the at least one second rotatable ground-engaging element, the second steering output shaft experiencing the same speed change as the first steering output shaft but in an opposite rotational direction from the first steering output shaft when the asymmetrical steering differential receives the single power input from the steering power input device, a speed reducer mounted on the chassis connecting the second steering output shaft to the second differential shaft so that the second steering output shaft experiences the same speed change but in an opposite rotational direction as the first steering output shaft when the asymmetrical steering differential receives power from the steering power input device.

In some embodiments, the asymmetrical steering differential comprises a rotatable planetary reducer having an external housing and a ring gear fixedly secured to the external housing inside the external housing. The external housing is configured to receive the single power input from the steering power input device to rotate the external housing thereby rotating the rotatable planetary reducer relative to the chassis. In some embodiments, the first differential shaft is an output shaft connected to planet gears of the rotatable planetary reducer through a carrier, and the second differential shaft is an input shaft connected to a sun gear of the rotatable planetary reducer. In some embodiments, the rotatable planetary reducer has a reduction ratio of 4:1.

In some embodiments, the speed reducer is a fixed planetary reducer having an input shaft connected to a sun gear of the fixed planetary reducer and an output shaft connected to planet gears through a carrier of the fixed planetary reducer. In some embodiments, the input shaft of the fixed planetary reducer is connected to the input shaft of the rotatable planetary reducer by a coupler. In some embodiments, the output shaft of the fixed planetary reducer is the second steering output shaft operatively connected to the at least one second ground-engaging element. In some embodiments, the output shaft of the rotatable planetary reducer is the first steering output shaft operatively connected to the at least one first ground-engaging element such that the first differential shaft, the output shaft of the rotatable planetary reducer and the first steering output shaft are one and the same. In some embodiments, the fixed planetary reducer has a reduction ratio that is the same as the rotatable planetary reducer.

The input shaft of a planetary reducer, has a faster rotational speed than the output shaft. A rotational impetus can be applied to either the input shaft or the output shaft of the planetary reducer. When the rotational impetus is applied to the input shaft, the input shaft rotates at a speed with a torque, to drive the output shaft at a lower speed and a higher torque. When the rotational impetus is applied to the output shaft, the output shaft rotates at a speed with a torque, to drive the input shaft at a higher speed and a lower torque. For both the rotatable planetary reducer and the fixed planetary reducer, the terms input shaft and output shaft are defined as described above.

In some embodiments, the rotatable planetary reducer and the fixed planetary reducer are aligned along a first transverse axis. In some embodiments, the steering power input device is aligned along a second transverse axis longitudinally separated from the first transverse axis. In some embodiments, the propulsion system comprises a propulsion transmission aligned along a third transverse axis longitudinally separated from both the first and second transverse axes.

In some embodiments, the vehicle comprises a first compartment for holding lubricating oil situated at the first side of the vehicle, wherein all of the operative connections at the first side of the chassis are in the first compartment. In some embodiments, the vehicle comprises a second compartment for holding lubricating oil situated at the second side of the vehicle, wherein all of the operative connections at the second side of the chassis are in the second compartment.

The steering system provides smooth steering, has a simple design, can use simple transmission parts with little or no customization, can be configured in a variety of different vehicles without the need for different transmission parts and is easier to maintain than previously known steering systems, for example by permitting the swapping of parts. Separating the steering system from the propulsion system permits the use of simple transaxles for the propulsion system. Further, separating the propulsion and steering systems, instead of integrating these functions into a unit gearbox, allows for more options for both propulsion power and steering power. Steering input can be hydraulic or electric. Propulsion input can be mechanical (internal combustion engine plus F-N-R shifter or continuously variable transmission (CVT), hydraulic (e.g. variable speed hydraulic motor powered by an internal combustion engine), or electric (e.g. variable speed electric motor powered from batteries or a generator or both). The propulsion system can be designed independently of the steering system, allowing for the use of simple solutions rather than relying on a complex and expensive custom gearbox.

Propulsion power for the vehicle is provided by at least one propulsion power input device, for example a gasoline engine, a diesel engine, an electric motor, a hydraulic motor or the like. In some embodiments, propulsion power flows through an open differential propulsion transaxle, which can be a single ratio box (e.g. as used with an electric drive), or a High/Low/Neutral/Reverse box (e.g. as used with a gasoline engine). In some embodiments, propulsion power is provided by using right and left hydraulic propulsion motors connected in parallel.

The vehicle may also be provided with service brakes that provide stopping power and, if actuated individually, provide emergency backup steering.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
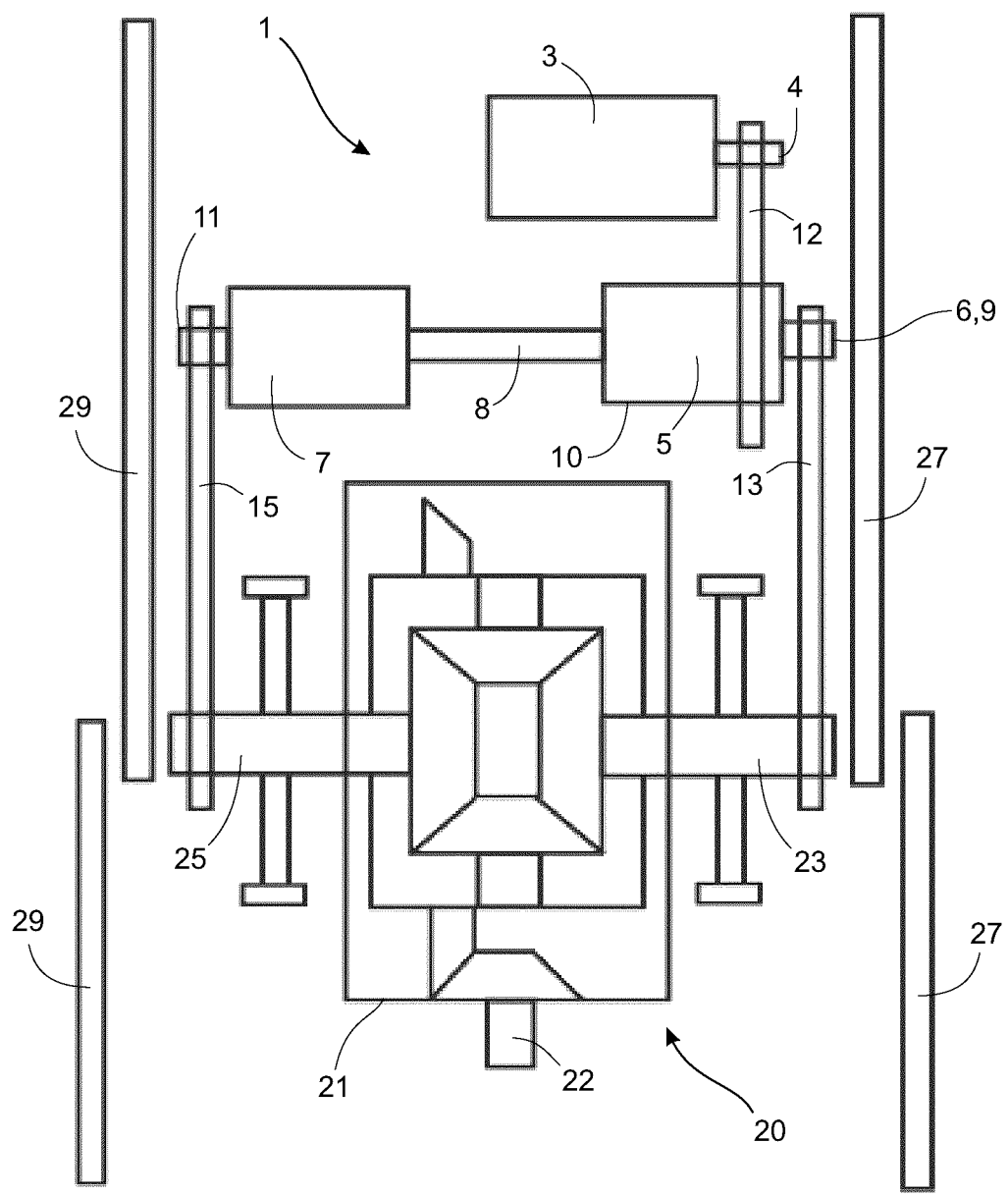
FIG. 1 depicts a schematic diagram of a layout of a steering system of the present invention in context with a propulsion system of a skid steered vehicle.

With reference to FIG. 1, one embodiment of a skid steering system 1 comprises a variable-speed steering power input device 3, an asymmetrical steering differential 5, a speed reducer 7, a first steering output shaft 9 and a second steering output shaft 11. The asymmetrical steering differential 5 comprises a first differential shaft 6 and a second differential shaft 8. In this embodiment, the first differential shaft 6 and the first steering output shaft 9 are shown as a single shaft, although the two shafts could be separate but connected shafts. The asymmetrical steering differential 5 is any device that can receive a single power input from the steering power input device 3 to impart different speed changes on the first differential shaft 6 and the second differential shaft 8 in opposite rotational directions, where the second differential shaft 8 has imparted thereon a greater speed change than the first differential shaft 6. The asymmetrical steering differential 5 is operatively connected to the steering power input device 3 to receive a single power input from the steering power input device 3. Operative connection of the asymmetrical steering differential 5 to the steering power input device 3 is accomplished in any suitable manner, for example by connecting a steering input shaft 4 of the steering power input device 3 to a housing 10 of the asymmetrical steering differential 5 with a steering differential power input chain or belt 12. When a steering differential power input chain is used, the steering input shaft 4 and the housing 10 may be equipped with sprockets to accept the chain. The steering power input device 3 may be a variable-speed motor, for example an electric motor or a hydraulic motor.

The second differential shaft 8 is connected to the speed reducer 7, the speed reducer 7 also being connected to the second steering output shaft 11. The speed reducer 7 has the same reducing ratio as the asymmetrical steering differential 5 so that the second steering output shaft 11 experiences the same speed change but in the opposite rotational direction as the first steering output shaft 9. Thus, while the second steering output shaft 11 has a lower rotational speed than the second differential shaft 8, the second steering output shaft 11 rotates in the same rotational direction as the second differential shaft 8. The speed reducer 7 may be any suitable device that can transfer rotational power from one shaft to another shaft while resulting in the other shaft having a slower rotational speed. The speed reducer 7 may comprise a collection of appropriately sized and arranged chains and sprockets, or may comprise a meshed gear arrangement. A planetary reducer comprising a ring gear, a sun gear and one or more planet gears meshing the sun gear with the ring gear is a particularly suitable example of the speed reducer.

The first steering output shaft 9 and the second steering output shaft 11 are each operatively connected to at least one rotatable ground-engaging element (e.g. wheels, tracks and the like) on respective sides of the vehicle. Operative connection is made by any suitable method, for example direct connection of the first and second steering output shafts 9, 11 to the ground-engaging element, or indirect connection through drive belts or chains. In FIG. 1, a first steering input chain 13 connects the first steering output shaft 9 to a first axle 23 of an open-differential propulsion transmission 21 of a propulsion system 20, while a second steering input chain 15 connects the second steering output shaft 11 to a second axle 25 of the propulsion transmission 21. The first axle 23 of the propulsion transmission 21 provides propulsion power input from a propulsion power input device 22 (e.g. a gasoline engine, a diesel engine, an electric motor, a hydraulic motor or the like) to the ground-engaging elements on a first side of the vehicle through first drive chains or belts 27, and a the second axle 25 of the propulsion transmission 21 provides propulsion power input from the propulsion power input device 22 to the ground-engaging elements on a second side of the vehicle through second drive chains or belts 29.

The steering system 1 superimposes power on the propulsion system 20 to steer the vehicle. When the steering power input device 3 drives the steering input shaft 4 in a first rotational direction, speed is added to the first axle 23 and speed is subtracted from the second axle 25 causing the vehicle to turn in one direction. When the steering power input device 3 drives the steering input shaft 4 in a second rotational direction, speed is added to the second axle 25 and speed is subtracted from the first axle 23 causing the vehicle to turn in the other direction.

In FIG. 1, the asymmetrical steering differential 5 and the speed reducer 7 are aligned along one transverse axis. The steering power input device 3 is aligned along a different transverse axis longitudinally separated from the transverse axis of the asymmetrical steering differential 5 and the speed reducer 7. The propulsion transmission 21 of the propulsion system 20 is aligned along yet a third transverse axis longitudinally separated from both the other two transverse axes. It is therefore possible to use simple parts in the steering system 1 and to place the steering system 1 at any convenient place along the vehicle.

Figure 2:
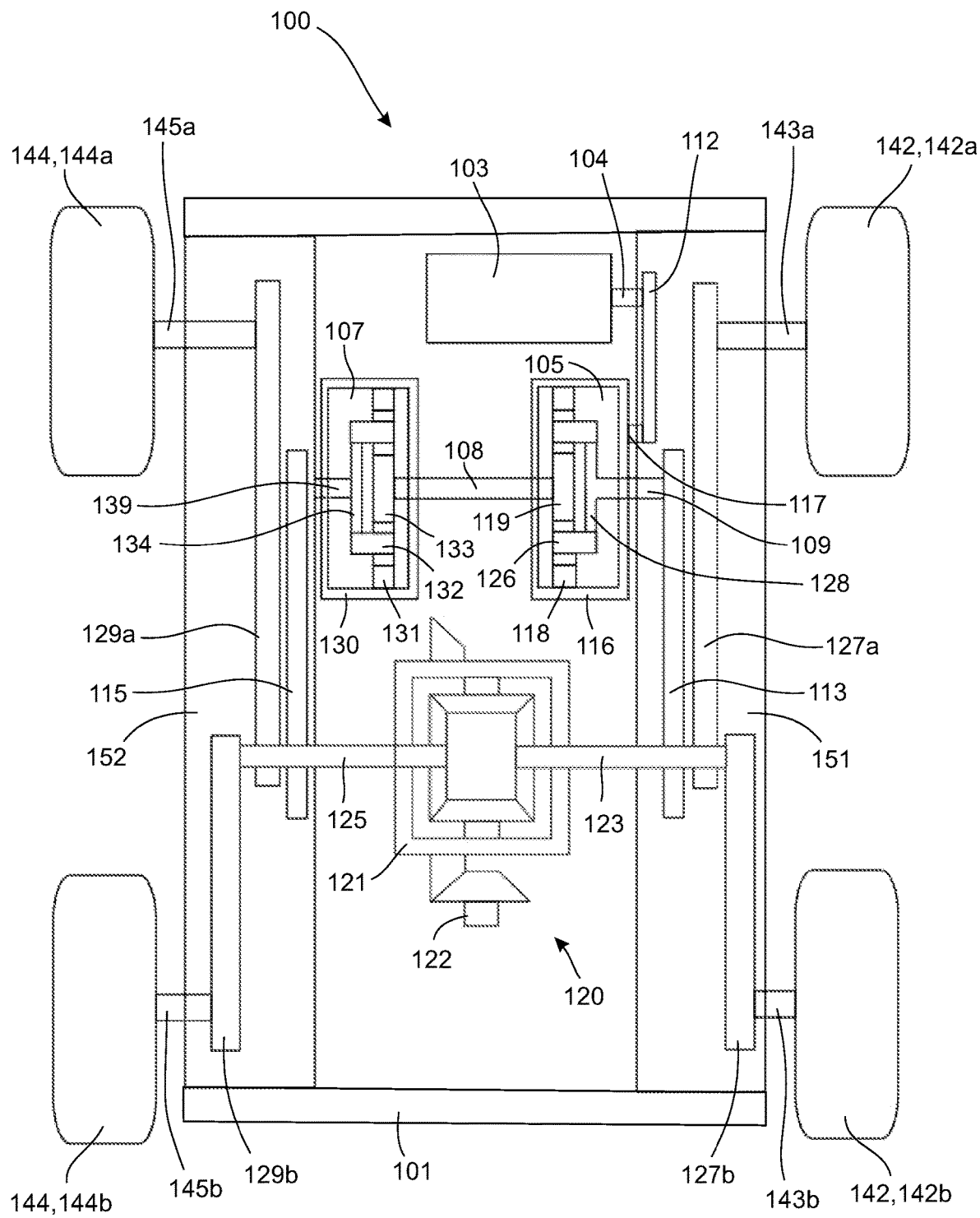
FIG. 2 depicts a schematic diagram of a four-wheeled skid steered vehicle showing steering components of one embodiment of the steering system of FIG. 1.

FIG. 2 depicts a schematic diagram of a skid steered vehicle 100 comprising one embodiment of the steering system 1 described in connection with FIG. 1. The vehicle 100 has a chassis 101, a pair of right-side wheels 142 including a front right wheel 142a and a rear right wheel 142b rotatably mounted at a right side of the chassis 101, and a pair of left-side wheels 144 including a front left wheel 144a and a rear left wheel 144b rotatably mounted at a left side of the chassis 101. The vehicle further comprises a propulsion system 120 mounted on the chassis 101, the propulsion system 120 comprising an engine drive shaft 122 connected to a vehicle engine, which drives a right intermediate shaft 123 and a left intermediate shaft 125 through an open-differential propulsion transmission 121. The right intermediate shaft 123 is drivingly connected to a front right wheel axle 143a by a front right final drive chain 127a, and is drivingly connected to a rear right wheel axle 143b by a rear right final drive chain 127b. The left intermediate shaft 125 is drivingly connected to a front left wheel axle 145a by a front left final drive chain 129a, and is drivingly connected to a rear left wheel axle 145b by a rear left final drive chain 129b. While a four-wheeled vehicle is shown, for a tracked vehicle only one final drive chain on each side would be needed as front and rear track hubs are connected by the track. For vehicles with six or more wheels, more final drive chains may be employed. The engine drive shaft 122 provides power input to the propulsion transmission 121, which distributes the power to the right and left intermediate shafts 123, 125, respectively, the right and left intermediate shafts 123, 125 providing power input to the final drive chains 127a, 127b, 129a, 129b, which provide power input to the wheel axles 143a, 143b, 145a, 145b, which in turn provide power to the wheels 142a, 142b, 144a, 144b mounted on the wheel axles 143a, 143b, 145a, 145b. The intermediate shafts 123, 125 and the wheel axles 143a, 143b, 145a, 145b are provided with sprockets on which the final drive chains 127a, 127b, 129a, 129b are mounted. Using appropriately sized sprockets and lengths of chains permits setting the desired power input to the wheels 142, 144. The right and left intermediate shafts 123, 125 are rotated in the same direction and the vehicle 100 can be driven forward or backward by operation of the propulsion transmission 121 in a known manner.

The steering system comprises a variable-speed electric steering motor 103 having a drive shaft 104 operatively connected to an external housing 116 of a rotatable planetary reducer 105 by a steering power input chain 112 on a sprocket fixedly mounted on the drive shaft 104 of the electric steering motor 103 and on a sprocket fixedly mounted on a receiving shaft 117 unitized with the external housing 116 of the rotatable planetary reducer 105. The rotatable planetary reducer 105 is rotatably mounted on one transverse side of the chassis 101, for example the right side as shown in FIG. 2, so that the external housing 116 is able to rotate, i.e. spin, relative to the chassis 101 about a first transverse axis when powered by the electric steering motor 103. The electric steering motor 103 is mounted on the chassis 101 on the same side as the rotatable planetary reducer 105 so that the drive shaft 104 rotates about a second transverse axis longitudinally separated from the first transverse axis. The propulsion transmission 121 is mounted on the chassis 101 so that the right and left intermediate shafts 123, 125 are aligned with and rotate about a third transverse axis longitudinally separated from both the first and second transverse axes. The rotatable planetary reducer 105 comprises a first ring gear 118 (e.g. a 90 T ring gear) rigidly affixed to an inner wall of the external housing 116 so that the first ring gear 118 rotates with the external housing 116 as the external housing 116 rotates. The rotatable planetary reducer 105 further comprises a first sun gear 119 (e.g. a 30 T sun gear) and a first plurality of planet gears 126 (e.g. 3×30 T planet gears), the first plurality of planet gears 126 intermeshed with and located between the first ring gear 118 and the first sun gear 119. A steering cross-shaft 108 is fixed to the first sun gear 119 and a first output shaft 109 is fixedly mounted to the first plurality of planet gears 126 by a first carrier 128. The first output shaft 109 is operatively connected to the right intermediate shaft 123 by a first steering chain 113 mounted on sprockets, the sprockets fixedly mounted on the first output shaft 109 and the right intermediate shaft 123.

The steering cross-shaft 108 is also connected to a fixed planetary reducer 107 non-rotatably mounted to the chassis 101 on an opposite side of the chassis 101 from the rotatable planetary reducer 105. The fixed planetary reducer 107 has essentially the same construction as the rotatable planetary reducer 105. Thus, the fixed planetary reducer 107 has a second sun gear 133, a second plurality of planet gears 132 and a second ring gear 131, the second ring gear 131 fixedly attached to an external housing 130 of the fixed planetary reducer 107. Because the fixed planetary reducer 107 is non-rotatably mounted to the chassis 101, the external housing 130 of the fixed planetary reducer 107 is unable to rotate relative to the chassis 101. A second output shaft 139 is fixedly mounted to the second plurality of planet gears 132 by a second carrier 134. The second output shaft 139 is operatively connected to the left intermediate shaft 125 by a second steering chain 115 mounted on sprockets, the sprockets fixedly mounted on the second output shaft 139 and the left intermediate shaft 125.

While the steering cross-shaft 108 is shown as a single shaft in FIG. 2, the steering cross-shaft 108 could instead be two separate shafts connected by a coupler. One of the separate shafts could be an input shaft of the rotatable planetary reducer 105 and the other separate shaft could be an input shaft of the fixed planetary reducer 107, the input shafts being connected to the respective sun gears 119, 133 of the rotatable and fixed planetary reducers 105, 107.

When the external housing 116 of the rotatable planetary reducer 105 is rotated by the electric steering motor 103, the first ring gear 118 causes imparts a change in rotational speed of the first plurality of planet gears 126, which imparts a change in rotational speed of the first output shaft 109 as well as a change in rotational speed of the first sun gear 119. The change in rotational speed of the first sun gear 119 causes a change in rotational speed of the steering cross-shaft 108, which causes a change in rotational speed of the second sun gear 133 in the fixed planetary reducer 107 on the opposite side of the vehicle 100 from the rotatable planetary reducer 105. A change in rotational speed of the second sun gear 133 causes a change in rotational speed of the second plurality of planet gears 132, which causes a change in rotational speed of the second output shaft 139. If desired or required, a motor speed reducer between the electric steering motor 103 and the rotatable planetary reducer 105 can be used to reduce speed from the drive shaft 104 of the electric steering motor 103 to the rotatable planetary reducer 105, for example a speed reduction in a ratio in a range of 3:1 to 4:1. The motor speed reducer may comprise a planetary reducer or differently sized sprockets on the drive shaft 104 and the receiving shaft 117 on the external housing 116 of the rotatable planetary reducer 105.

Because the steering cross-shaft 108 is connected to the fixed planetary reducer 107, which is non-rotatably mounted on the chassis 101, and also to the first sun gear 119, the fixed planetary reducer 107 constrains the first sun gear 119 so that rotation of the external housing 116 of the rotatable planetary reducer 105, which imparts a change in rotational speed of the first ring gear 118 therein, can cause a change in rotational speed of the first sun gear 119 and the first plurality of planet gears 126 when the external housing 116 of the rotatable planetary reducer 105 is rotated by the steering motor 103. Further, as a result of the change in rotational speed of the first ring gear 118 and subsequent changes in rotational speed of the first sun gear 119 and the first plurality of planet gears 126, the change in rotational speed of the first output shaft 109 is in an opposite rotational direction from the change in rotational speed of the steering cross-shaft 108. However, at the fixed planetary reducer 107, the external housing 130 of the fixed planetary reducer 107, and the second ring gear 131 fixedly mounted therein, cannot rotate relative to the chassis 101 so the steering cross-shaft 108 imparts a change in rotational speed of the second sun gear 133 and the second plurality of planet gears 132 causing a change in rotational speed of the second output shaft 139 in the same rotational direction as the steering cross-shaft 108. In this way, the rotational speeds of the first output shaft 109 and the second output shaft 139 are caused to change in opposite rotational directions when the electric steering motor 103 is operated. Further, by requiring the reduction ratios of the rotatable and fixed planetary reducers 105, 107 to be the same, the change in speeds of the first output shaft 109 and the second output shaft 139 are the same, albeit in opposite rotational directions.

Because the first output shaft 109 is operatively connected to the right intermediate shaft 123, and the second output shaft 139 is operatively connected to the left intermediate shaft 125, rotation of output shafts 109, 139 adds speed to or subtracts speed from the intermediate shafts 123, 125. If desired or required, further speed reducers (e.g. differently sized sprockets at each end of each of the steering chains 113, 115) may be used to reduce speed from the output shafts 109, 139 to the intermediate shafts 123, 125, respectively, for example a speed reduction in a ratio in a range of 2:1 to 3:1. Reducing the speed from the output shafts 109, 139 to the intermediate shafts 123, 125 reduces the required torque on the rotatable and fixed planetary reducers 105, 107, respectively, thereby permitting the use of lighter, less expensive components. Because the two output shafts 109, 139 change rotational speed in opposite rotational directions when the electric steering motor 103 is operated, speed is added to the intermediate shaft at one side of the vehicle 100, and therefore the wheels at that side, and speed is subtracted from the intermediate shaft, and therefore the wheels, at the other side of the vehicle 100. This causes the vehicle 100 to turn toward the side where the wheels are rotating slower.

Furthermore, if desired or required, further speed reducers (e.g. differently sized sprockets at each end of each of the final drive chains 127a, 127b, 129a, 129b,) may be used to reduce speed from the intermediate shafts 123, 125 to the wheel axles 143a, 143b, 145a, 145b, for example a speed reduction in a ratio in a range of 2:1 to 3:1.

One advantage of the steering system 1 lies in the arrangement where all of the operative connections between the various shafts are located proximate one side or the other of the vehicle 100 in a relatively narrow transverse space extending longitudinally along a length of the vehicle 100. Thus, proximate the right side of the vehicle 100, the steering power input chain 112, the first steering chain 113, the front right final drive chain 127a and the rear right final drive chain 127b, as well as all of the sprockets on which the chains are mounted, are all located in a narrow space between the rotatable planetary reducer 105 and the right-side wheels 142. Likewise, proximate the left side of the vehicle 100, the second steering chain 115, the front left final drive chain 129a and the rear left final drive chain 129b, as well as all of the sprockets on which the chains are mounted, are all located in a narrow space between the fixed planetary reducer 107 and the left-side wheels 144. It is therefore possible to include two transversely spaced-apart longitudinally extending enclosed compartments for containing lubricating oil surrounding all of the operative connections (i.e. chain drives) between the various shafts. Thus, a first oil compartment 151 is formed in the chassis 101 from chassis beams at the right side of the vehicle 100, and second oil compartment 152 is formed in the chassis 101 from chassis beams at the left side of the vehicle 100. The steering power input chain 112, the first steering chain 113, the front right final drive chain 127a and the rear right final drive chain 127b, as well as all of the sprockets on which the chains are mounted, are all located in the first oil compartment 151. The second steering chain 115, the front left final drive chain 129a and the rear left final drive chain 129b, as well as all of the sprockets on which the chains are mounted, are all located in the second oil compartment 152. The oil compartments 151, 152 are filled with lubricating oil to form oil baths that lubricate the operative connections during operation of the vehicle 100, and the only exposed connection is the steering cross-shaft 108. The oil compartments 151, 152 are preferably sealed, and may be provided with removable panels to permit access to the operative connections for maintenance and replacement.

If desired or due to space constraints, the electric steering motor 103 and the rotatable planetary reducer 105 may be located on the left side of the vehicle 100 while the fixed planetary reducer 107 on the left side of the vehicle 100.

Operation of the vehicle 100 involves a variety of different driving operations including, for example, driving straight forward at full speed (Full Speed Straight, FSS), making a full left turn at zero speed (Zero Speed Full Left Turn, ZSFLT), making a full right turn at zero speed (Zero Speed Full Right Turn, ZSFRT), making a full left turn at full speed (Full Speed Full Left Turn, FSFLT), making a full right turn at full speed (Full Speed Full Right Turn, FSFRT), making a minor left turn at full speed (Full Speed Minor Left Turn, FSMLT), making a minor right turn at full speed (Full Speed Minor Right Turn, FSMLT), and making a low speed full left turn (LSFLT). Table 1 illustrates the rotational velocities (speed and direction) of various components of the vehicle 100 during the driving operations indicated above.

118, 131 of the rotatable and fixed planetary reducers 105, 107, respectively, so the first ring gear 118 does not rotate thus the external housing 116 of the rotatable planetary reducer 105 also does not rotate, and the drive shaft 104 of the steering motor 103 also does not rotate. Propulsion power does not flow through the rotatable planetary reducer 105 to the steering motor 103, therefore, when the steering motor 103 is not operated, the steering motor 103 and the external housing 116 of the rotatable planetary reducer 105 experience little or no torque. Table 1 further shows that the right and left wheels 142, 144 have a lower rotational speed than the right and left intermediate shafts 123, 125, respectively, because there are speed reducers between the right and left intermediate shafts 123, 125 and the right and left wheels 142, 144, respectively. Likewise, the speed reducers from the first and second output shafts 109, 139 to the right and left intermediate shafts 123, 125, respectively, means that rotational speed imparted on the the first and second output shafts 109, 139 by the right and left intermediate shafts 123, 125, respectively, is increased. In addition, the rotational speed of the steering cross-shaft 108 is greater

TABLE 1

| Vehicle Component | Rotational Velocity (rpm) | | | | | | | |
|---|---|---|---|---|---|---|---|---|
| | FSS | ZSFLT | ZSFRT | FSFLT | FSFRT | FSMLT | FSMRT | LSFLT |
| 120 Propulsion System | | | | | | | | |
| 121 propulsion transmission | +485.7 | 0 | 0 | +485.7 | +485.7 | +485.7 | +485.7 | +97.15 |
| 123 right intermediate shaft | +485.7 | +85 | −85 | +570.7 | +400.7 | +497.9 | +473.6 | +170 |
| 125 left intermediate shaft | +485.7 | −85 | +85 | +400.7 | +570.7 | +473.6 | +497.9 | +24.3 |
| 142 right wheels | +200 | +35 | −35 | +235 | +165 | +205 | +195 | +70 |
| 144 left wheels | +200 | −35 | +35 | +165 | +235 | +195 | +205 | +10 |
| 1 Steering System | | | | | | | | |
| 112 steering power input chain | 0 | +1812.4 | −1812.4 | +1812.4 | −1812.4 | +260.2 | −260.2 | +1561 |
| 118 first ring gear (rotatable reducer) | 0 | +566.7 | −566.7 | +566.7 | −566.7 | +81.0 | −81.0 | +485 |
| 108 steering cross-shaft | +4857.1 | −850 | +850 | +4007.1 | +5707.1 | +4735.7 | +4978.6 | +242.9 |
| 109 first output shaft (rotatable reducer) | +1214.3 | +212.5 | −212.5 | +1426.8 | +1001.8 | +1244.6 | +1183.9 | +425 |
| 139 second output shaft (fixed reducer) | +1214.3 | −212.5 | +212.5 | +1001.8 | +1426.8 | +1183.9 | +1244.6 | +60.7 |

Driving straight at full speed (FSS) causes the first output shaft 109, the second output shaft 139 and the steering cross-shaft 108 to rotate in the same rotatable direction as the right and left intermediate shafts 123, 125 because the first output shaft 109 is operatively connected to the right intermediate shaft 123, the second output shaft 139 is operatively connected to the left intermediate shaft 125 and the steering cross-shaft 108 is connected to both the first and second output shafts 109, 139 through the sun and planet gears of the rotatable and fixed planetary reducers 105, 107, respectively. There is no rotational load on the ring gears than those of the first and second output shafts 109, 139 by a factor of four because both the rotatable and fixed planetary reducers 105, 107 have a ratio of 4:1.

When making a zero-speed full turn left (ZSFLT) or right (ZSFRT), the engine is not operated so the rotational speed of the engine drive shaft 122 is zero. When the drive shaft 104 of the steering motor 103 is driven forward (+'ve direction), the vehicle 100 turns left, and when the drive shaft 104 of the steering motor 103 is driven backward (−'ve direction), the vehicle 100 turns right. The drive shaft 104 of the steering motor 103 is driven at top speed causing the external housing 116 of the rotatable planetary reducer 105 to rotate in the same direction but at a lower speed due to the speed reducer (3.2:1 ratio) between the drive shaft 104 and the rotatable planetary reducer 105. Rotation of the external housing 116 of the rotatable planetary reducer 105 causes the first output shaft 109 to rotate in the same rotational direction as the external housing 116 of the rotatable planetary reducer 105 but at a lower speed, while causing the steering cross-shaft 108 to rotate in the opposite rotational direction as the external housing 116 but at a higher speed. The speed ratio between the steering cross-shaft 108 and the first output shaft 109 is 4:1 because the rotatable planetary reducer 105 has a 4:1 ratio. The second output shaft 139 has the same rotational speed as the first output shaft 109 but in the opposite rotational direction. The output shafts 109, 139 impart rotational speed on respective intermediate shafts 123, 125 at a ratio of 2.5:1 due to speed reducers between the output shafts 109, 139 and the intermediate shafts 123, 125, and the intermediate shafts 123, 125 impart rotational speed on respective wheels 142, 144 at a ratio of 2.5:1 due to speed reducers between the intermediate shafts 123, 125 and the wheels 142, 144. While the rotational speeds of the right and left wheels 142, 144 are the same, the right wheels 142 rotate in the opposite direction as the left wheels 144 so the vehicle turns away from the side where the wheel are being driven forward (i.e. towards the side where the wheels are being driven backward).

The remaining driving operations illustrate rotational motion of the various vehicle components when the vehicle is both driven and turned. FSFLT, FSFRT, FSMLT and FSMRT illustrate that rotational motions imparted by the steering system 1 is superimposed on the rotational motions imparted by the propulsion system 20 because the steering system 1 is operatively connected to the propulsion system 20 by the steering chains 113, 115, even though the steering system 1 and the propulsion system are otherwise separated. The average speed of the wheels 142, 144, thus the speed of the vehicle 100, is directly proportional to the speed of the engine (i.e. speed of the engine drive shaft 122). The rotational speed of the vehicle 100 (yaw) is directly proportional to the speed of the steering motor 103.

Figure 3:
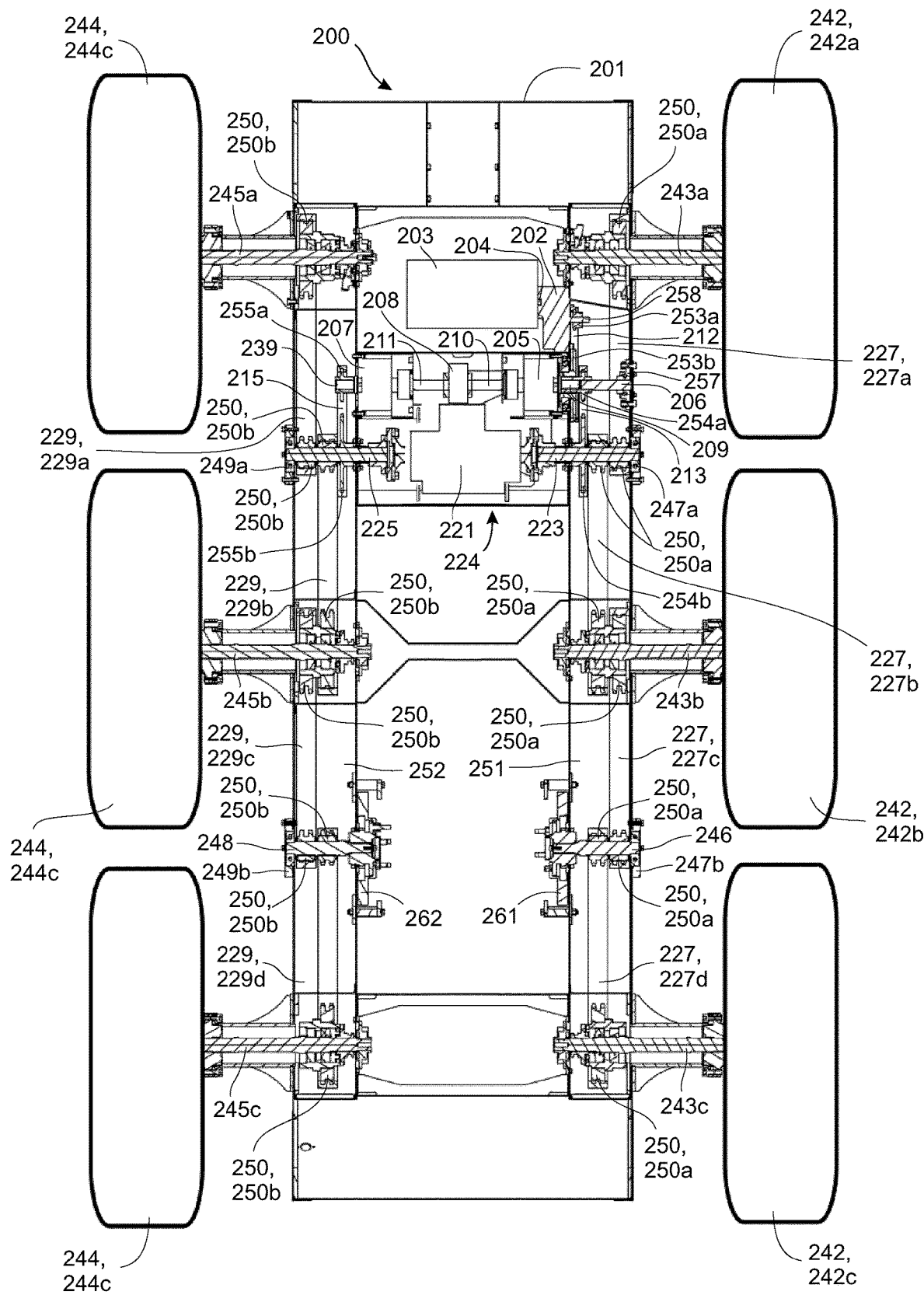
FIG. 3 depicts a schematic diagram of a six-wheeled skid steered vehicle with an embodiment of the steering system of FIG. 1.
Figure 4:
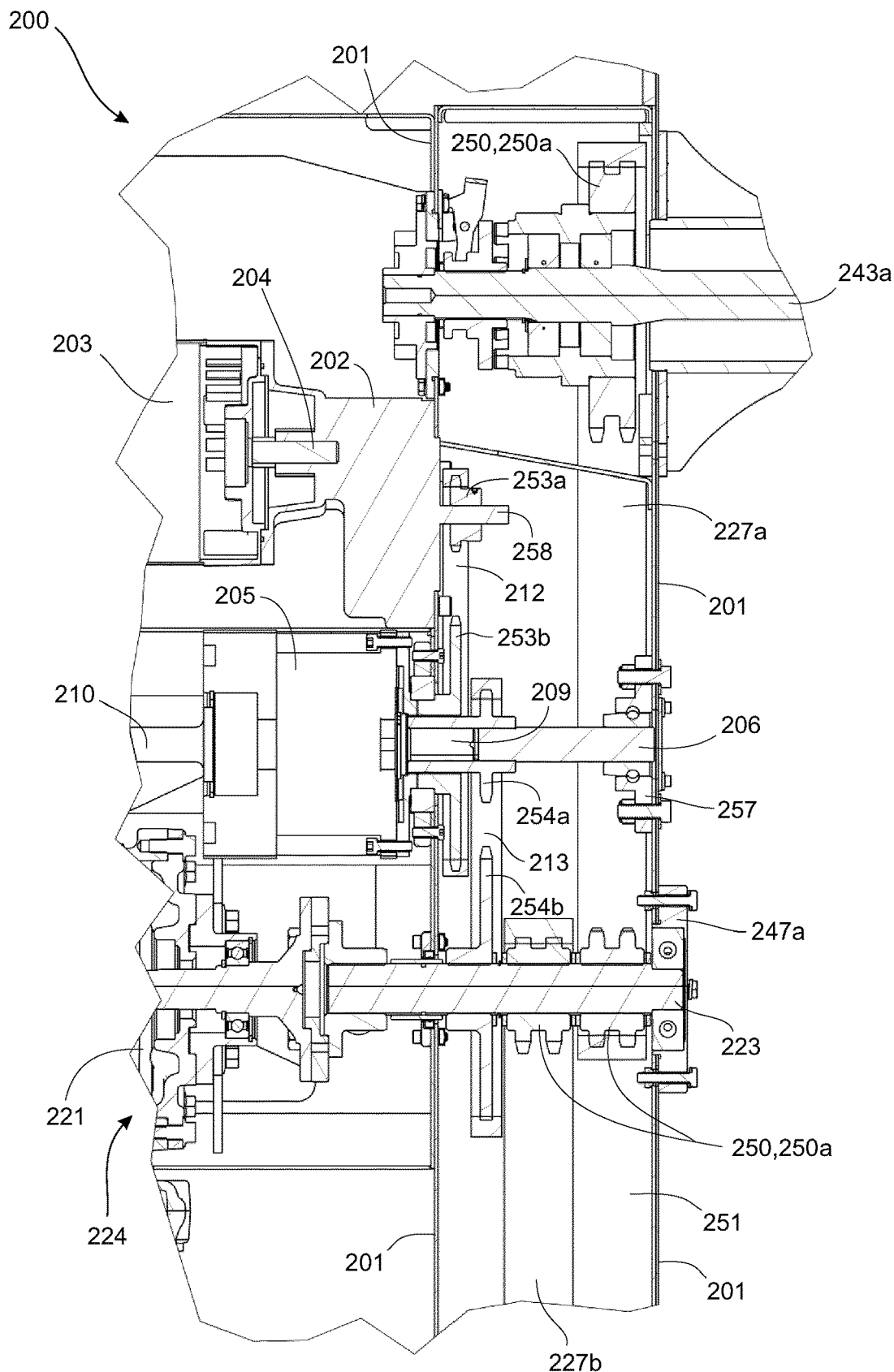
FIG. 4 depicts a magnified view of a steering motor and rotatable planetary reducer of the steering system in the vehicle of FIG. 3.

FIG. 3 and FIG. 4 depict a six-wheeled skid steered vehicle 200 comprising an embodiment of the steering system of FIG. 1. The vehicle 200 comprises a chassis 201 on which three pairs of transversely opposed wheels are rotatably mounted. The wheels comprise right wheels 242 including a right front wheel 242a, a right middle wheel 242b and a right rear wheel 242c, and left wheels 244 including a left front wheel 244a, a left middle wheel 244b and a left rear wheel 244c. The right wheels 242a, 242b, 242c are mounted on right wheel axles 243a, 243b, 243c, respectively. The left wheels 244a, 244b, 244c are mounted on left wheel axles 245a, 245b, 245c, respectively. The wheel axles 243a, 243b, 243c, 245a, 245b, 245c are rotatably mounted on the chassis 201. The wheels 242, 244 are driven by a propulsion motor (not shown) that is coupled through a main drive shaft (not shown) to a propulsion transaxle 224 comprising an open propulsion differential 221, the propulsion differential 221 being connected to right and left intermediate shafts 223, 225, respectively. The propulsion motor drives rotation of the right and left intermediate shafts 223, 225, respectively. The right wheel axles 243a, 243b, 243c are all driven by rotation of the right intermediate shaft 223, the right wheel axles 243a, 243b, 243c being operatively connected to the right intermediate shaft 223 by four right final drive chains 227 (individually labeled as 227a, 227b, 227c, 227d). The left wheel axles 245a, 245b, 245c are all driven by rotation of the left intermediate shaft 225, the left wheel axles 245a, 245b, 245c being operatively connected to the left intermediate shaft 225 by four left final drive chains 229 (individually labeled as 229a, 229b, 229c, 229d). First and second right idler assemblies 247a, 247b, respectively, and first and second left idler assemblies 249a, 249b, respectively, are mounted on the chassis 201 so that four shorter final drive chains may be used on each side of the vehicle 200. The first right idler assembly 247a rotatably supports the right intermediate shaft 223 while the first left idler assembly 249a rotatably supports the left intermediate shaft 225. The second right idler assembly 247b rotatably supports a right idler shaft 246 while the second left idler assembly 249b rotatably supports a left idler shaft 248. The wheel axles (243a, 243b, 243c, 245a, 245b, 245c) intermediate shafts (223, 225) and idler shaft (246, 248) all have sprockets 250 (i.e. right sprockets 250a and left sprockets 250b) fixedly mounted thereon, on which the final drive chains (227, 229) are mounted. All of the right final drive chains 227 and right sprockets 250a are located within a right oil bath compartment 251, and all of the left final drive chains 229 and left sprockets 250b are located within a left oil bath compartment 252. The oil bath compartments 251, 252 are sealed compartments formed from chassis beams and contain lubricating oil to keep chains and sprockets lubricated during operation of the vehicle 200.

Similar to the embodiment described in connection with FIG. 2, the steering system for the embodiment of FIG. 3 and FIG. 4 comprises an electric steering motor 203, a rotatable planetary reducer 205 having a reduction ratio of 4:1, a fixed planetary reducer 207 having a reduction ratio of 4:1, a right steering chain 213 and a left steering chain 215. A motor speed reducer 202 with a reduction ratio of 5:1 is mounted between a drive shaft 204 of the electric steering motor 203 and the rotatable planetary reducer 205. Power is transmitted from the electric steering motor 203 to the rotatable planetary reducer 205 by a steering input chain 212, which connects a sprocket 253a fixedly mounted on an output shaft 258 of the motor speed reducer 202 to a sprocket 253b fixedly mounted on a receiving shaft 217, the rotational speed of the sprocket 253b being about 3.2× less than the rotational speed of the sprocket 253a. The receiving shaft 217 is fixedly mounted on an external housing of the rotatable planetary reducer 205. As previously described, rotation of the external housing of the rotatable planetary reducer 205 causes a change in rotational speed of an output shaft 209. A proximal end of a first differential shaft 206 is axially aligned with and directly connected to a distal end of the output shaft 209 so that the change in rotational speed of the output shaft 209 causes a change in rotational speed of the first differential shaft 206. The first differential shaft 206 is rotationally supported by a third right idler assembly 257 mounted on the chassis 201. The first differential shaft 206 is operatively connected to the right intermediate shaft 223 by the right steering chain 213, which is mounted on sprockets 254a, 254b fixedly mounted to the first differential shaft 206 and the first intermediate shaft 223, respectively, the rotational speed of the sprocket 254b being 2.5× less than the rotational speed of the sprocket 254a. The rotatable planetary reducer 205 has an input shaft 210, which is axially aligned in a transverse direction with an input shaft 111 of the fixed planetary reducer 207. The two input shafts 110, 111 are rotationally connected by a coupler 208 so that a change in rotational speed of the input shaft 210 of the rotatable planetary reducer 205 causes a change in rotational speed of the input shaft 111 of the fixed planetary reducer 207. An output shaft 239 of the fixed planetary reducer 207 is operatively connected to the left intermediate shaft 225 by the left steering chain 215, which is mounted on sprockets 255a, 255b fixedly mounted to the output shaft 239 and the left intermediate shaft 225, respectively. Operation of steering system is as described in connection with FIG. 2. The steering input chain 212, the right steering chain 113 and the sprockets 253a, 253b, 254a, 254b involved with the steering system at the right side of the vehicle 200 are located in the right oil bath compartment 251. The left steering chain 115 and all of the sprockets 255a, 255b involved with the steering system at the left side of the vehicle 200 are located in the left oil bath compartment 252.

Service brakes can be located on the wheel axles of one of the wheel pairs, or on another shaft. In the embodiment shown in FIG. 3, a right service brake 261 is located on the right idler shaft 246 between the right middle wheel 242b and the right rear wheel 242c; and a left service brake 262 is located on the left idler shaft 248 between the left middle wheel 244b and the left rear wheel 244c.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:
1. A skid steered vehicle comprising:
a chassis;
at least one first rotatable ground-engaging element rotatably mounted on the chassis proximate a first transverse side of the chassis and at least one second rotatable ground-engaging element rotatably mounted on the chassis proximate a second transverse side of the chassis so that rotation of the first and second rotatable ground-engaging elements moves the vehicle;
a propulsion system mounted on the chassis and operatively connected to the first and second rotatable ground-engaging elements for driving the ground-engaging elements; and,
a steering system comprising:
a variable-speed steering power input device mounted on the chassis separately from the propulsion system;
an asymmetrical steering differential operatively connected to the steering power input device to receive a single power input from the steering power input device to rotate the asymmetrical steering differential,
the asymmetrical steering differential rotatably mounted on the chassis proximate the first side of the chassis separately from the propulsion system so that the asymmetrical steering differential is free to rotate relative to the chassis, and
the asymmetrical steering differential having a first differential shaft and a second differential shaft, the asymmetrical differential imparting a greater speed change on the second differential shaft than the first differential shaft during operation of the asymmetrical steering differential,
a first steering output shaft connected to the first differential shaft and operatively connected to the at least one first rotatable ground-engaging element, the first steering output shaft experiencing a speed change when the asymmetrical steering differential receives the single power input from the steering power input device;
a second steering output shaft connected to the second differential shaft and operatively connected to the at least one second rotatable ground-engaging element, the second steering output shaft experiencing the same speed change as the first steering output shaft but in an opposite rotational direction from the first steering output shaft when the asymmetrical steering differential receives the single power input from the steering power input device,
a speed reducer mounted on the chassis connecting the second steering output shaft to the second differential shaft so that the second steering output shaft experiences the same speed change but in an opposite rotational direction as the first steering output shaft when the asymmetrical steering differential receives power from the steering power input device.

2. The vehicle of claim 1, wherein the asymmetrical steering differential comprises a rotatable planetary reducer having an external housing and a ring gear fixedly secured to the external housing inside the external housing, wherein the external housing is configured to receive the single power input from the steering power input device to rotate the external housing thereby rotating the rotatable planetary reducer relative to the chassis.

3. The vehicle of claim 2, wherein the first differential shaft is an output shaft connected to planet gears of the rotatable planetary reducer and the second differential shaft is an input shaft connected to a sun gear of the rotatable planetary reducer.

4. The vehicle of claim 3, wherein the rotatable planetary reducer has a reduction ratio of 4:1.

5. The vehicle of claim 3, wherein:
the speed reducer is a fixed planetary reducer having an input shaft connected to a sun gear of the fixed planetary reducer and an output shaft connected to planet gears of the fixed planetary reducer;
the input shaft of the fixed planetary reducer is connected to the input shaft of the rotatable planetary reducer by a coupler;
the output shaft of the fixed planetary reducer is the second steering output shaft operatively connected to the at least one second rotatable ground-engaging element;
the output shaft of the rotatable planetary reducer is the first steering output shaft operatively connected to the at least one first rotatable ground-engaging element such that the first differential shaft, the output shaft of the rotatable planetary reducer and the first steering output shaft are one and the same; and,
the fixed planetary reducer has a reduction ratio that is the same as the rotatable planetary reducer.

6. The vehicle of claim 5, wherein the rotatable planetary reducer and the fixed planetary reducer are aligned along a first transverse axis, the steering power input device is aligned along a second transverse axis longitudinally separated from the first transverse axis, and the propulsion system comprises a propulsion transmission aligned along a third transverse axis longitudinally separated from both the first and second transverse axes.

7. The vehicle of claim 1, further comprising:
a first compartment for holding lubricating oil situated at the first side of the vehicle, wherein all of the operative connections at the first side of the chassis are in the first compartment; and,
a second compartment for holding lubricating oil situated at the second side of the vehicle, wherein all of the operative connections at the second side of the chassis are in the second compartment.

8. The vehicle of claim 1, wherein the operative connections comprise chains and sprockets.

9. The vehicle of claim 8, wherein the sprockets comprise a housing sprocket affixed to the asymmetrical steering differential, and the chains comprise a steering differential power input chain operatively connecting the asymmetrical steering differential to the steering power input device.

10. The vehicle of claim 1, wherein the steering power input device is a variable-speed electric motor or a variable speed hydraulic motor.

11. The vehicle of claim 1, wherein the first and second rotatable ground-engaging elements are wheels.

12. The vehicle of claim 1, wherein the first and second rotatable ground-engaging elements are tracks.

13. A steering system for a skid steered vehicle, the steering system comprising:
   a variable-speed steering power input device mounted on a chassis of the vehicle separately from a propulsion system of the vehicle;
   an asymmetrical steering differential operatively connected to the steering power input device to receive a single power input from the steering power input device to rotate the asymmetrical steering differential,
      the asymmetrical steering differential rotatably mounted on the chassis proximate a first side of the chassis separately from the propulsion system so that the asymmetrical steering differential is free to rotate relative to the chassis, and
      the asymmetrical steering differential having a first differential shaft and a second differential shaft, the asymmetrical differential imparting a greater speed change on the second differential shaft than the first differential shaft during operation of the asymmetrical steering differential,
   a first steering output shaft connected to the first differential shaft and operatively connected to the at least one first rotatable ground-engaging element, the first steering output shaft experiencing a speed change when the asymmetrical steering differential receives the single power input from the steering power input device;
   a second steering output shaft connected to the second differential shaft and operatively connected to the at least one second rotatable ground-engaging element, the second steering output shaft experiencing the same speed change as the first steering output shaft but in an opposite rotational direction from the first steering output shaft when the asymmetrical steering differential receives the single power input from the steering power input device,
   a speed reducer mounted on the chassis connecting the second steering output shaft to the second differential shaft so that the second steering output shaft experiences the same speed change but in an opposite rotational direction as the first steering output shaft when the asymmetrical steering differential receives power from the steering power input device.

14. The steering system of claim 13, wherein the asymmetrical steering differential comprises a rotatable planetary reducer having an external housing and a ring gear fixedly secured to the external housing inside the external housing, wherein the external housing is configured to receive the single power input from the steering power input device to rotate the external housing thereby rotating the rotatable planetary reducer relative to the chassis.

15. The steering system of claim 14, wherein the first differential shaft is an output shaft connected to planet gears of the rotatable planetary reducer and the second differential shaft is an input shaft connected to a sun gear of the rotatable planetary reducer.

16. The steering system of claim 15, wherein the rotatable planetary reducer has a reduction ratio of 4:1.

17. The steering system of claim 15, wherein:
   the speed reducer is a fixed planetary reducer having an input shaft connected to a sun gear of the fixed planetary reducer and an output shaft connected to planet gears of the fixed planetary reducer;
   the input shaft of the fixed planetary reducer is connected to the input shaft of the rotatable planetary reducer by a coupler;
   the output shaft of the fixed planetary reducer is the second steering output shaft operatively connected to the at least one second rotatable ground-engaging element;
   the output shaft of the rotatable planetary reducer is the first steering output shaft operatively connected to the at least one first rotatable ground-engaging element such that the first differential shaft, the output shaft of the rotatable planetary reducer and the first steering output shaft are one and the same; and,
   the fixed planetary reducer has a reduction ratio that is the same as the rotatable planetary reducer.

\* \* \* \* \*